(12) United States Patent
Hirose

(10) Patent No.: US 10,237,450 B2
(45) Date of Patent: Mar. 19, 2019

(54) IMAGE FORMING APPARATUS FOR CORRECTING CURVE OF IMAGE IN SUB SCANNING DIRECTION, AND CONTROL METHOD FOR SAME

(71) Applicant: CANON KABUSHIKI KAISHA, Tokyo (JP)

(72) Inventor: Fumiaki Hirose, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/967,113

(22) Filed: Dec. 11, 2015

(65) Prior Publication Data

US 2016/0191748 A1  Jun. 30, 2016

(30) Foreign Application Priority Data

Dec. 25, 2014  (JP) ................. 2014-263173

(51) Int. Cl.
  *H04N 1/58* (2006.01)
  *H04N 1/50* (2006.01)
(52) U.S. Cl.
  CPC ..... *H04N 1/506* (2013.01); *H04N 2201/0094* (2013.01)
(58) Field of Classification Search
  CPC ... G03G 2215/0158; G03G 2215/0161; G03G 2215/0164; G03G 2215/00063; G03G 2215/00037; G03G 2215/00054; G03G 2215/000974; G03G 2215/01; G03G 15/5058; G03G 15/5062; G03G 15/5041; G03G 15/5016; G03G 15/5054; G03G 15/507; G03G 15/5075; G03G 15/50; G03G 15/01; G03G 15/16; G06K 15/027; G06K 15/14; G06K 15/002; G06K 15/129;

(Continued)

(56) References Cited

U.S. PATENT DOCUMENTS 6,714,748 B1 * 3/2004 Nakayasu .......... G03G 15/5058
                                                         347/116
7,916,366 B2    3/2011 Utsunomiya
(Continued)

FOREIGN PATENT DOCUMENTS

JP      H08-262829 A    10/1996
JP      09-109453 A     4/1997
(Continued)

*Primary Examiner* — Jamares Q Washington
(74) *Attorney, Agent, or Firm* — Canon USA, Inc., IP Division

(57) ABSTRACT

An image forming apparatus includes a printing unit configured to print a chart in which patterns, each including an image object in a first process color and an image object in a second process color, are arranged at each of at least three positions in a main scanning direction, a receiving unit configured to receive, from a user, a plurality of pieces of information relating to correction of a color shift between the first process color and the second process color, the plurality of pieces of information being based on the patterns arranged in the printed chart and each corresponding to a different one of the at least three positions, and a correction unit configured to correct the color shift between the first process color and the second process color based on the received plurality of information.

14 Claims, 10 Drawing Sheets

(58) Field of Classification Search
CPC ....... G06K 15/1878; G06K 2215/0094; G06K 2215/648; G06K 2215/00045; G06K 2215/00082; G06K 2215/00087; G06K 2215/00352; B41P 2233/51; B41P 2233/52; H04N 1/00761; H04N 1/047; H04N 1/0473; H04N 1/053; H04N 1/058; H04N 1/60; H04N 1/6008; H04N 1/6011; H04N 1/6013; H04N 1/6033; H04N 1/6052; H04N 1/6055; H04N 1/6038; H04N 1/6041; H04N 2201/0094; G01J 3/52
USPC .......................................... 358/518, 1.9, 504
See application file for complete search history.

(56) References Cited

U.S. PATENT DOCUMENTS

| | | | |
|---|---|---|---|
| 8,743,436 B2 * | 6/2014 | Kano | H04N 1/6058 358/1.13 |
| 8,804,194 B2 * | 8/2014 | Saito | G06K 15/14 358/1.9 |
| 8,837,002 B2 * | 9/2014 | Fujiwara | G03G 15/0194 358/3.26 |
| 9,389,565 B2 * | 7/2016 | Lee | H04N 1/506 |
| 2005/0134874 A1 * | 6/2005 | Overall | B41J 29/393 358/1.9 |
| 2011/0058197 A1 | 3/2011 | Kano | |
| 2014/0153975 A1 * | 6/2014 | Lee | H04N 1/506 399/301 |

FOREIGN PATENT DOCUMENTS

| | | |
|---|---|---|
| JP | 2003-029488 A | 1/2003 |
| JP | 2003-276235 A | 9/2003 |
| JP | 2007-163679 A | 6/2007 |
| JP | 2008-051943 A | 3/2008 |
| JP | 2010-000720 A | 1/2010 |
| JP | 2014-021357 A | 2/2014 |
| RU | 2367016 C2 | 9/2009 |

* cited by examiner

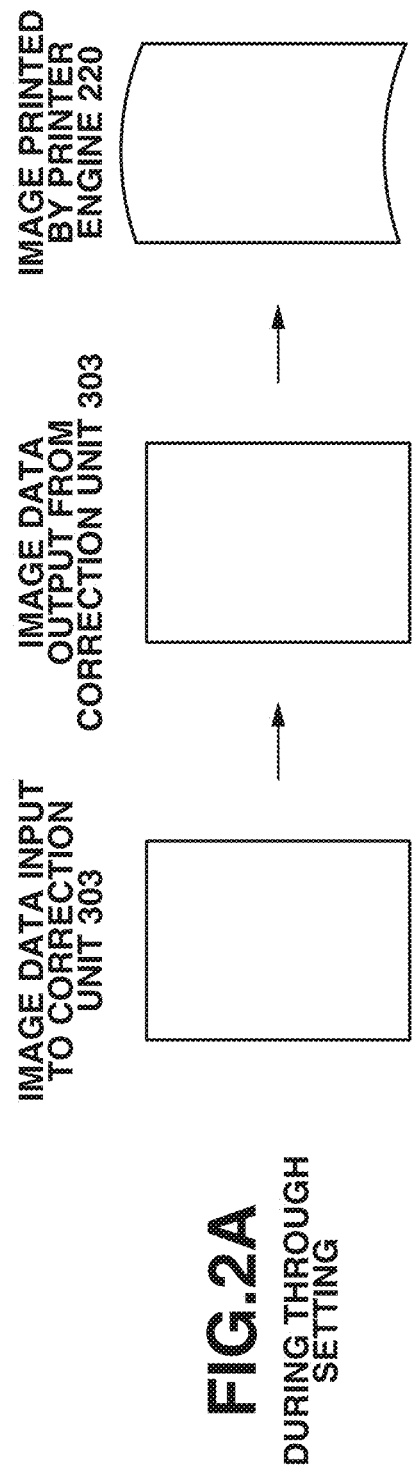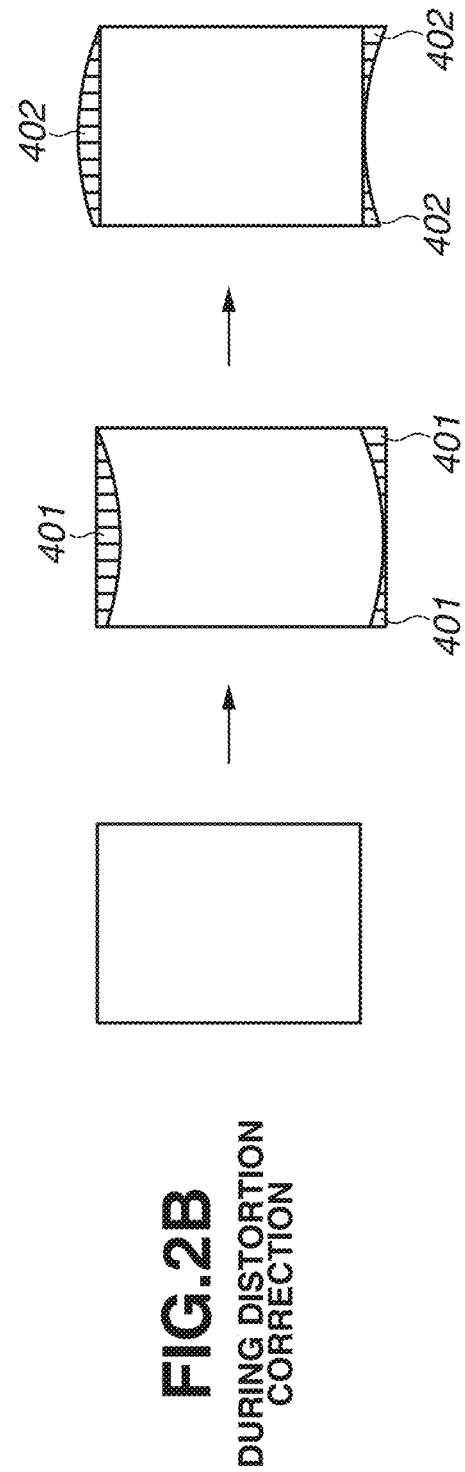

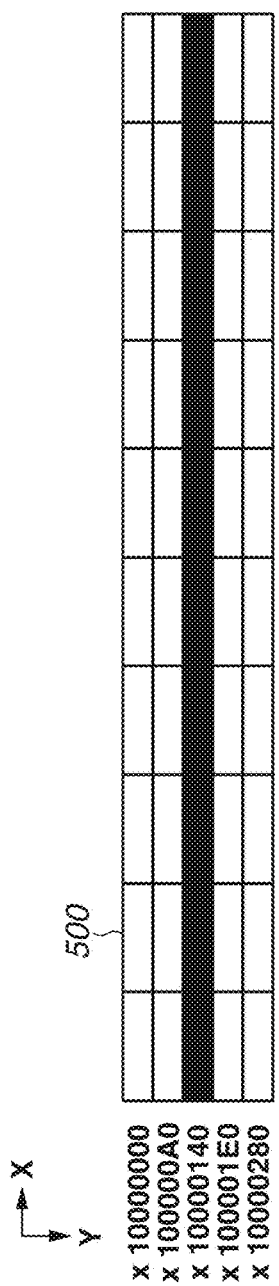

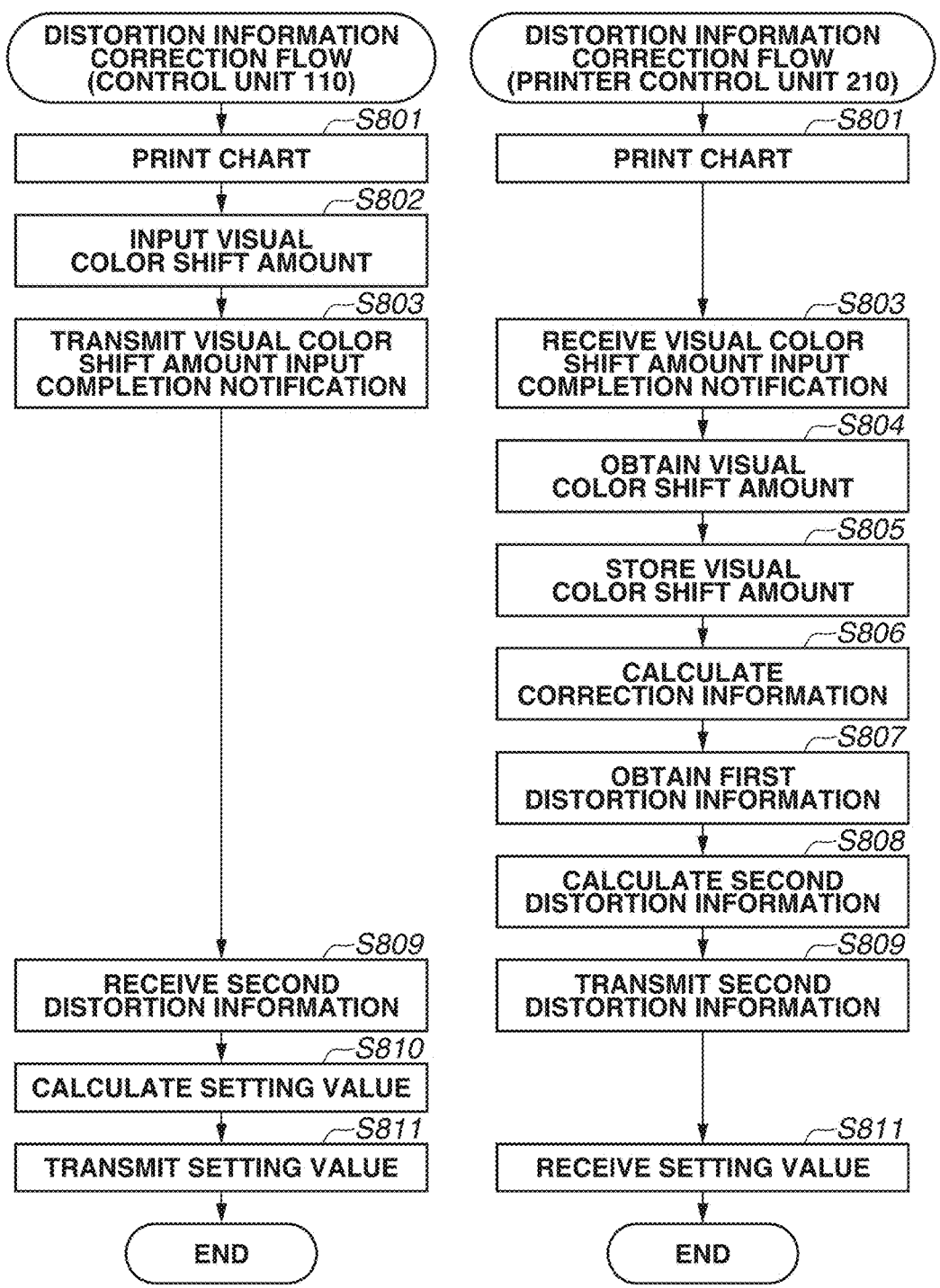

FIG.7

INPUT NUMBER OF PATTERN IN WHICH LINES
IN RESPECTIVE COLORS MATCH EACH OTHER.

|   | LEFT *1001* | CENTER *1002* | RIGHT *1003* |
|---|---|---|---|
| Y | 0 | -2 | 0 |
| M | 0 | -1 | 0 |
| K | 0 | 0 | 0 |

*1004*

OK

IMAGE FORMING APPARATUS FOR CORRECTING CURVE OF IMAGE IN SUB SCANNING DIRECTION, AND CONTROL METHOD FOR SAME

BACKGROUND OF THE INVENTION

Field of the Invention

The present disclosure relates to a distortion correction technique for reducing a distortion of an image.

Description of the Related Art

Due to long-term use of an image forming apparatus including an electrophotographic printer engine and replacement of a component such as a toner cartridge, a characteristic of an optical system (an optical system such as a polygon mirror or an fθ lens involved in laser beam scanning) in the printer engine may change. When the characteristic of the optical system changes, if a different optical system is used for each of process colors, a printing position shift occurs among the process colors. When the printing position shift occurs among the process colors, a color shift is noticeable and the image quality of a printed image thus may deteriorate.

Japanese Patent Application Laid-Open No. 2014-021357 discusses a technique for correcting a printing position shift among process colors to suppress a color shift. An image forming apparatus discussed in Japanese Patent Application Laid-Open No. 2014-021357 prints a chart including an image in which an image having a plurality of parallel lines, which is in reference color from among a plurality of process colors, and an image having a plurality of step-shaped images, which is in adjustment color from among the plurality of process colors, overlap each other. A user views the printed chart, to input one adjustment value representing the degree of a printing position shift between the reference color and the adjustment color. The image forming apparatus uniformly shifts printing positions of the images in the adjustment color based on the input adjustment value to suppress the occurrence of the color shift.

A laser beam for scanning a photosensitive member is curved in a sub-scanning direction or expands or contracts in a main-scanning direction depending on the optical system in the electrophotographic printer engine. The degree of the curvature or the expansion/contraction (i.e., the degree of the printing position shift in the sub-scanning direction and the main scanning direction) differs depending on a position in the main scanning direction. Thus, even if an adjustment value corresponding to one position in the main scanning direction is input, it is difficult to appropriately correct, only with the input adjustment value, a color shift between a reference color and an adjustment color corresponding to another position in the main scanning direction.

SUMMARY OF THE INVENTION

According to an aspect of the present disclosure, an image forming apparatus includes a printing unit configured to print a chart in which patterns, each including an image object in a first process color and an image object in a second process color, are arranged at each of at least three positions in a main scanning direction, a receiving unit configured to receive, from a user, a plurality of pieces of information relating to correction of a color shift between the first process color and the second process color, the plurality of pieces of information being based on the patterns arranged in the printed chart and each corresponding to a different one of at least three positions, and a correction unit configured to correct the color shift between the first process color and the second process color based on the received plurality of pieces of information.

According to other aspects of the present disclosure, one or more additional image forming apparatuses, one or more image forming methods, and one or more storage mediums are discussed herein. Further features of the present disclosure will become apparent from the following description of exemplary embodiments with reference to the attached drawings.

BRIEF DESCRIPTION OF THE DRAWINGS

FIGS. 2A and 2B are respectively conceptual diagrams of distortion correction in a sub-scanning direction.

FIGS. 3A, 3B, 3C, and 3D illustrate distortion correction in the sub-scanning direction.

FIG. 6 is a flowchart for calculating correction information about the distortion information in the sub-scanning direction.

FIG. 7 illustrates an input screen of a visual color shift amount.

DESCRIPTION OF THE EMBODIMENTS

Figure 1A:
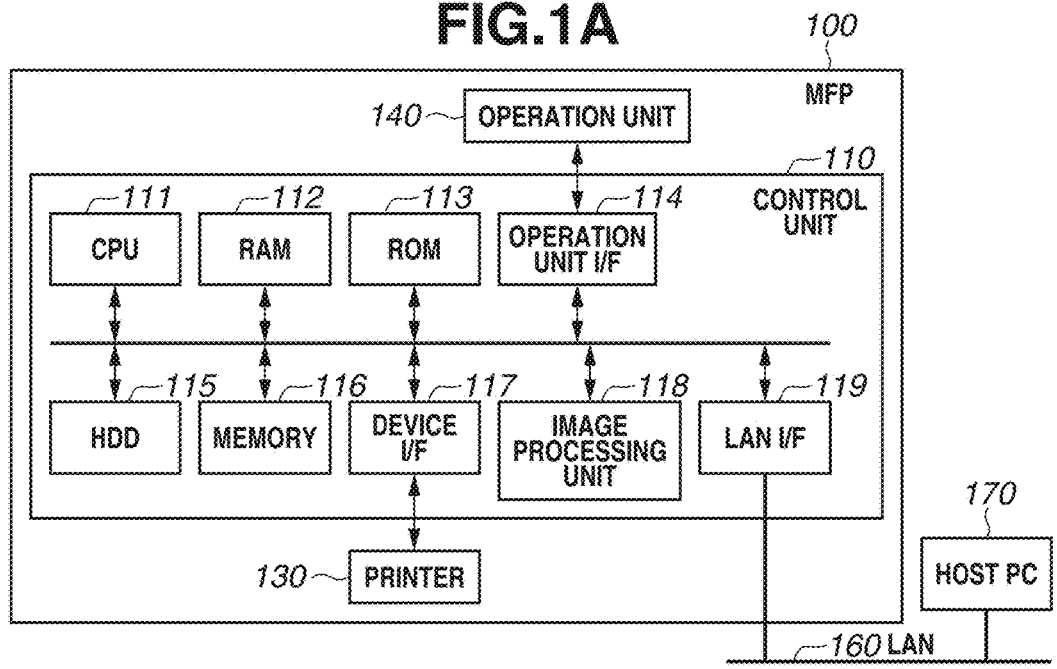
FIGS. 1A, 1B, and 1C are respectively system block diagrams of an image forming apparatus.

A first exemplary embodiment of the present disclosure will be described. FIG. 1A is a system block diagram of a multi function peripheral (MFP) 100 used as an image forming apparatus according to the present exemplary embodiment. In the MFP 100 according to the present exemplary embodiment, color printing using four process colors (cyan, magenta, yellow, and black) can be performed.

The MFP 100 is connected to a host personal computer (PC) 170 via a local area network (LAN) 160. The host PC 170 transmits Page Description Language (PDL) data serving as print data to the MFP 100 via the LAN 160. The MFP 100 rasterizes the received print data, to generate pieces of image data (bitmap images) of the different process colors. The generated pieces of image data may be subjected to halftone processing. The MFP 100 performs distortion correction on the generated pieces of image data, which will be described below (FIGS. 3A to 3D), and forms images of the different process colors based on the image data after the distortion correction in a manner such that the images are overlaid with one another. The MFP 100 prints a final image obtained by the overlay of the images of the different process colors on a sheet.

The MFP 100 according to the present exemplary embodiment previously stores chart image data (a predetermined bitmap image). The MFP 100 performs distortion correction on the chart image data. The MFP 100 forms the images of the different process colors based on the chart image data after the distortion correction in a manner such that the images are overlaid with one another. The MFP 100 prints the final image obtained by the overlay of the images of the different process colors on the sheet. The sheet on which the final image has been printed is a chart. The chart is used to correct (update) laser distortion information (merely referred to as distortion information) used for the distortion correction. Processing for the correction will be described below with reference to FIGS. 5A to 5C etc.

The MFP 100 includes a control unit 110, a printer 130, and an operation unit 140.

The control unit 110 includes a central processing unit (CPU) 111, a random access memory (RAM) 112, a read only memory (ROM) 113, an operation unit interface (I/F) 114, a hard disk drive (HDD) 115, a memory 116, a device I/F 117, an image processing unit 118, and a LAN I/F 119.

The LAN I/F 119 is an interface that connects the LAN 160 and the control unit 110, and transmits and receives data to and from the external host PC 170 via the LAN 160. The host PC 170 is connected to the MFP 100 via the LAN 160, and transmits print data to the MFP 100.

The HDD 115 stores system software, image data, and a program for controlling an operation of the MFP 100 etc. The HDD 115 stores a program (rasterization program) for rasterizing the print data and generating pieces of image data which are bitmap images of the different process colors. The HDD 115 also stores bitmap images of the different process colors for printing a chart, described below. The HDD 115 further stores a program for implementing processing in a flowchart illustrated in FIG. 6, described below.

The CPU 111 integrally controls the operation of the MFP 100, and performs the processing based on a program stored in the RAM 112 or the program stored in the HDD 115. The ROM 113 is a boot ROM, and stores a boot program for a system of the MFP 100.

The CPU 111 executes the rasterization program stored in the HDD 115, to convert the print data, which has been received via the LAN I/F 119, into pieces of image data, which are bitmap images, of the different process colors. The bitmap images of the different process colors are transmitted to the image processing unit 118, described below, to perform each image processing.

The memory 116 stores image data and other data, like the HDD 115. Bitmap images of the different process colors before the image processing and bitmap images of the different process colors after the image processing are also stored in the memory 116, as described below. The bitmap images after the image processing are transmitted to the printer 130 via the device I/F 117, described below.

The image processing unit 118 performs image processing on the bitmap images of the different process colors that have been input from the memory 116, and outputs the bitmap images after the image processing to the memory 116. As the image processing, distortion correction is performed for each of the process colors for correcting (reducing) a distortion (color shift) in a printed image. The larger a printing position shift between the respective images in the process colors becomes, the more significant the color shift becomes. A configuration of the image processing unit 118 will be separately described with reference to FIG. 1C.

The device I/F 117 connects the printer 130 and the control unit 110, and transmits image data from the control unit 110 to the printer 130. At this time, the device I/F 117 serializes the bitmap images of the different process colors stored in the memory 116, and transmits the serialized bitmap images to the printer 130. The device I/F 117 performs transmission and reception of distortion information, described below, between the control unit 110 and the printer 130.

The operation unit I/F 114 is an interface that connects the operation unit 140 and the control unit 110, and outputs, to the operation unit 140, image data on a screen (e.g., FIG. 7) displayed on the operation unit 140. The operation unit I/F 114 transmits, to the CPU 111, information that has been input by a user via the screen illustrated in FIG. 7 displayed on the operation unit 140 (e.g., information used for correcting the distortion information).

Figure 1B:
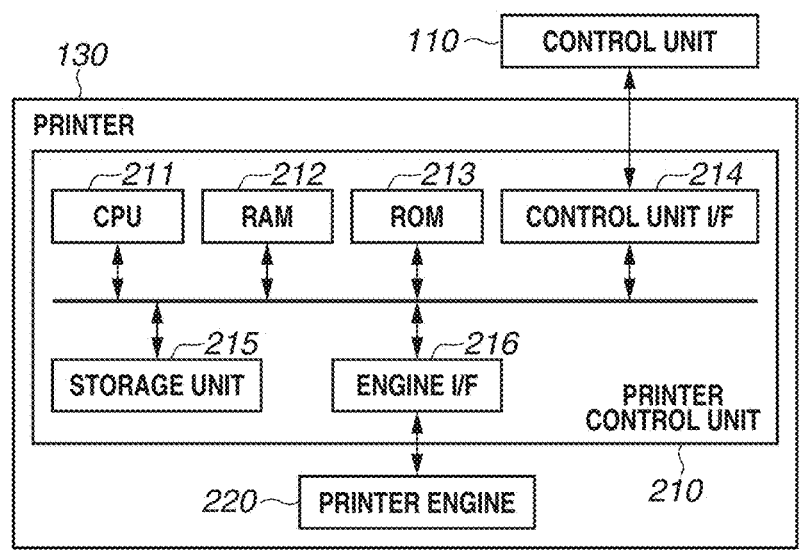

FIG. 1B illustrates a configuration of the printer 130. The printer 130 transmits and receives data (the distortion information and pieces of image data of the different process colors) to and from the control unit 110 via the device I/F 117.

The printer 130 includes a printer control unit 210 and a printer engine 220. The printer control unit 210 is connected to the printer engine 220, and controls the printer engine 220.

The printer control unit 210 includes a CPU 211, a RAM 212, a ROM 213, a control unit I/F 214, a storage unit 215, and an engine I/F 216. The CPU 211 integrally controls an operation of the printer 130, and operates based on a program stored in the RAM 212. The ROM 113 is a boot ROM, and stores a boot program in the printer control unit 210. The control unit I/F 214 is connected to the control unit 110, and performs transmission and reception of image data and various types of information between the printer control unit 210 and the control unit 110.

The CPU 211 transmits and receives distortion information, described below, to and from the control unit 110 via the control unit I/F 214.

The storage unit 215 stores a program for controlling an operation of the printer control unit 210 etc. The storage unit 215 also stores correction information, described below. The printer control unit 210 combines (adds) the correction information with distortion information, which has been obtained from a ROM (not illustrated) included in a printer engine 220, and transmits a combining result to the control unit 110. The control unit 110 performs distortion correction on each of the pieces of image data of the different process colors using the transmitted distortion information. For convenience of illustration, the distortion information stored in the ROM (not illustrated) included in the printer engine 220 is referred to as first distortion information, and the distortion information after the combining, which is to be transmitted from the printer control unit 210 to the control unit 110 is referred to as second distortion information.

The engine I/F 216 is connected to the printer engine 220, and the CPU 211 controls the printer engine 220 via the engine I/F 216.

Figure 4:
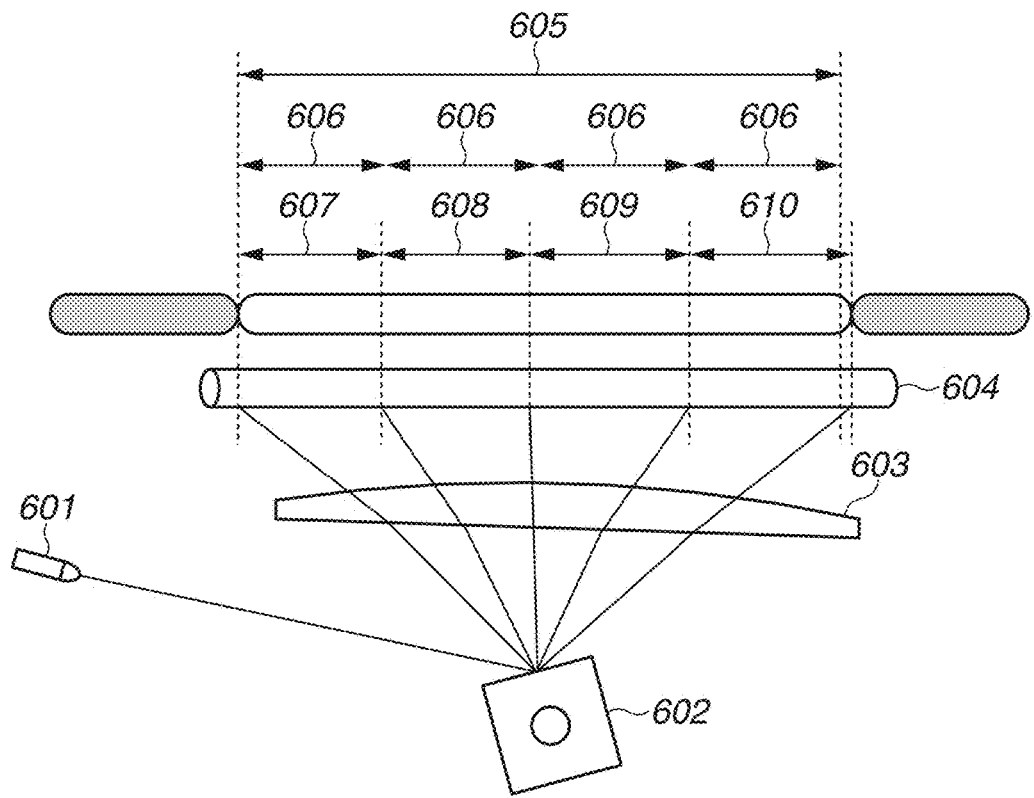
FIG. 4 illustrates a configuration of a printer engine.

The printer engine 220 in the present exemplary embodiment is an electrophotographic printer engine, and includes a plurality of (four) laser scanner units each corresponding to a different one of the plurality of (four) process colors. FIG. 4 illustrates a part of a configuration of one of the plurality of laser scanner units included in the printer engine 220. In FIG. 4, 601 denotes a laser beam irradiation port, 602 denotes a rotating polygon mirror (hereinafter referred to as a polygon mirror), 603 denotes an fθ lens and 604 denotes a photosensitive member.

The laser beam irradiation port 601 irradiates a laser beam based on the image data in the corresponding process color that has been received from the control unit 110 via the device I/F 117 and the engine I/F 216. The laser beam irradiated from the laser beam irradiation port 601 is reflected by the polygon mirror, and scans the photosensitive member 604 via the fθ lens 603. The fθ lens 603 deflects the laser beam, which has been reflected at a constant angular velocity by the polygon mirror 602, so that scanning is executed (ideally) at a constant velocity on the photosensitive member 604. The printer engine 220 in the present exemplary embodiment has a distortion in a sub-scanning direction (a curve 1102 illustrated in FIG. 8) and a distortion in a main-scanning direction (expansions/contractions 607 to 610 illustrated in FIG. 4) in scanning of the laser beam, described below. The distortion differs depending on the laser scanner unit (the process color). As a result, a printing position shifts among the process colors and a color shift is thus noticeable.

The printer engine 220 includes a ROM (not illustrated), and the ROM (not illustrated) stores the above described first distortion information. The first distortion information is information representing the distortions in the sub-scanning direction and the main scanning direction for each of the laser scanner units in the printer engine 220, which have been measured in a factory during shipment of the MFP 100, and specific to the laser scanner unit. The CPU 211 in the printer control unit 210 obtains the first distortion information stored in the ROM (not illustrated) in the printer engine 220 via the engine I/F 216. The CPU 211 in the printer control unit 210 combines the obtained first distortion information and the correction information stored in the storage unit 215 to generate second distortion information, and transmits the generated second distortion information to the control unit 110 via the control unit I/F 214.

Figure 1C:
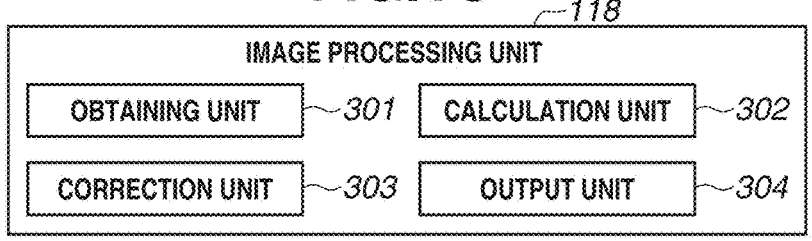

FIG. 1C illustrates a configuration of the image processing unit 118 included in the control unit 110. Each of units illustrated in FIG. 1C includes hardware. The image processing unit 118 includes an obtaining unit 301, a calculation unit 302, a correction unit 303, and an output unit 304.

The obtaining unit 301 obtains the second distortion information from the printer 130 via the device I/F 117.

The calculation unit 302 calculates a setting value used for distortion correction, described below, for each of the process colors based on the obtained second distortion information.

The correction unit 303 performs distortion correction, described below, on the image data for each of the process colors using the calculated setting value.

The output unit 304 outputs the image data, which has been subjected to the distortion correction, to the printer 130 via the device I/F 117.

<Concept of Distortion Correction in Sub-Scanning Direction>

As described above, the printer engine 220 in the present exemplary embodiment has the distortions in the main scanning direction and the sub-scanning direction in the scanning of the laser beam. The distortions occur due to a characteristic change such as a mounting error of an optical system such as the polygon mirror 602 or the fθ lens 603. The MFP 100 according to the present exemplary embodiment performs distortion correction for canceling the distortion in the sub-scanning direction in the scanning by shifting, in a pixel unit, pixels included in image data in an opposite direction to the distortion. If the distortion in the sub-scanning direction in the scanning is curved to be projected in an upward direction (in a minus direction in the sub-scanning direction), for example, the image data is curved (in practice, is shifted in the sub-scanning direction of the pixels) to be projected in a downward direction (in a plus direction in the sub-scanning direction).

FIGS. 2A and 2B illustrate a concept of distortion correction in the sub-scanning direction performed for image data. FIG. 2A illustrates image data input to and output from the correction unit 303 and a printed image when distortion correction is not performed (during through setting). FIG. 2B illustrates image data input to and output from the correction unit 303 and a printed image when distortion correction is performed (during distortion correction). Both FIGS. 2A and 2B illustrate the image data input to the correction unit 303, the image data output from the correction unit 303, and the image data printed by the printer engine 220 based on the output image data in this order from the left.

In FIG. 2A, the image data input to the correction unit 303 is a rectangular bitmap image. In FIG. 2A, distortion correction is not performed on the rectangular image data. Thus, the image data output from the correction unit 303 is a rectangular bitmap image, like the input image data. When the output image data is printed by the printer engine 220 having an upwardly projected curvature distortion characteristic, the printed image becomes a rectangular image having an upwardly projected curvature distortion.

When distortion correction is performed, however, an image whose distortion has been reduced is printed, as illustrated in FIG. 2B. In FIG. 2B, the image data input to the correction unit 303 is a rectangular bitmap image, like in FIG. 2B. In FIG. 2B, distortion correction is performed on the rectangular image data. More specifically, the rectangular bitmap image is curved to be downwardly projected (pixels are shifted). An area 401 indicated by a vertical-line pattern illustrated in FIG. 2B is invalid image data (a white pixel group) given to an area where original image data does not exist, as a result of the curvature. The invalid image data is not exposed with the laser beam. Thus, a printing result is not affected. When the image data, which has been thus subjected to the distortion correction, is printed by the printer engine 220, like in FIG. 2A, a curvature to which the image data has been previously subjected and a distortion which the printer engine 220 has are canceled out. Therefore, the distortion is reduced in the printed image. At this time, the area 401 serving as the invalid image data corresponds to an area 402 that does not affect a printing result.

The foregoing is a concept of the distortion correction performed by the MFP 100 according to the present exemplary embodiment.

<Distortion Correction in Sub-Scanning Direction>

Details of the distortion correction will be described with reference to FIGS. 3A to 3D. For simplicity of illustration, distortion correction for image data of the magenta process color among the four process colors (yellow, magenta, cyan, and black) of the printer engine 220 will be described below. Note that the same applies to the other process colors.

FIG. 3A illustrates an example of image data input to the correction unit 303. The image data is a bitmap image 500 generated when print data is rasterized. The bitmap image 500 includes two bits per pixel. While the bitmap image 500 includes two bits per pixel in the present exemplary embodiment, the bitmap image 500 may include one bit per pixel or four bits per pixel. The generated bitmap image 500 is stored, starting at an address 0x10000000 in the memory 116, and one line extending in the main scanning direction of the bitmap image 500 includes 640 pixels. Since the bitmap image 500 is represented by two bits per pixel, the first line of the bitmap image 500 is stored at addresses 0x10000000 to 0x1000009F (corresponding to 160 bytes), and the second line, which is one line below the first line in the sub-scanning direction, is stored at addresses 0x100000A0 to 0x1000013F (corresponding to 160 bytes). Each of the third to fifth lines is also similarly stored at addresses in the memory 116 every 640 pixels, i.e., every 160 bytes. In FIG. 3A, consecutive 64 pixels (i.e., corresponding to 16 bytes) form one segment. As described below, in the distortion correction in the present exemplary embodiment, respective shift amounts in the sub-scanning direction for 64 pixels forming one segment are the same.

First, the obtaining unit 301 obtains the second distortion information from the printer 130, as described above. The calculation unit 302 calculates a setting value for distortion correction based on the obtained second distortion information. A method for the calculation will be described.

Figure 8:
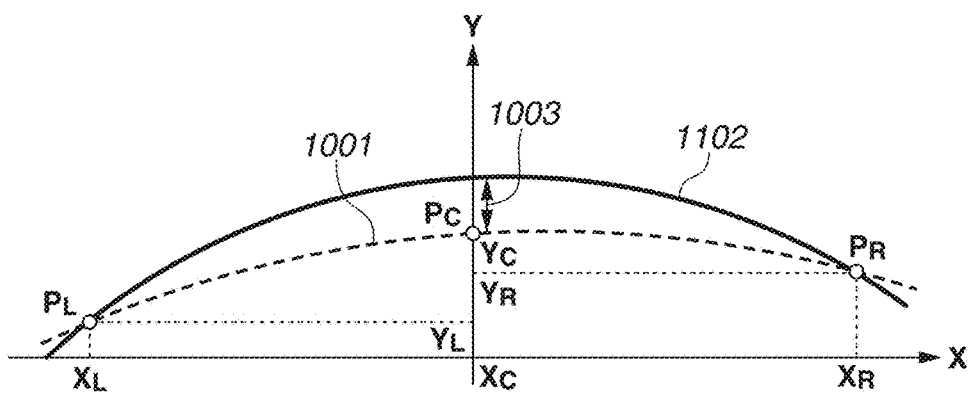
FIG. 8 is a conceptual diagram of a distortion of a scanning line.

Each of the first distortion information and the second distortion information in the present exemplary embodiment are three-point information. As described above, the first distortion information is fixed information representing a curvature characteristic of a laser beam scanning line measured in a factory during shipment of the MFP 100. The second distortion information is information obtained by combining correction information with the first distortion information and obtained by correcting the curvature characteristic of the scanning line measured in the factory using correction information, described below. The three-point information is a position (an X coordinate value) in the main scanning direction and a position (a Y coordinate value) in the sub-scanning direction of each of three points PL, PC, and PR illustrated in FIG. 8, for example. A unit representing a position is a micrometer [μm], for example. In FIG. 8, positions in the main scanning direction and the sub-scanning direction of the point PL are respectively XL and YL. Coordinates of the point PC are XC and YC. Coordinates of the point PR are XR and YR.

The calculation unit 302 calculates a secondary curve y=ax^2+bx+c passing through the three points based on the above described coordinates of the three points. The secondary curve y=ax^2+bx+c is illustrated as a secondary curve 1101 in FIG. 8. The secondary curve 1101 is a curvature characteristic of a scanning line of a laser beam that is considered to be correct at the current time point by the MFP 100. To simplify calculation, the point PC may be provided at a position where its X coordinate XC is 0 (i.e., the center).

The second distortion information represents a relative positional shift in the sub-scanning direction of an image of the magenta process color from an image of a process color serving as a reference color. In the present exemplary embodiment, the reference color is the yellow process color. More specifically, the curve 1101 indicates, in micrometer unit, a relative positional shift in the sub-scanning direction of an image of the magenta process color from an image of the process color serving as the reference color, for each of the positions in the main scanning direction.

The calculation unit 302 substitutes an X-coordinate value corresponding to each of segments into a variable x in the secondary curve (y=a x^2+bx+c) 1101, to calculate y (a Y-coordinate value). The calculated y is represented in a micrometer unit. Thus, the calculation unit 302 considers printing resolution in the sub-scanning direction and converts y to a pixel unit. If the printing resolution in the sub-scanning direction is 600 dpi, for example, the size (the height) of one pixel is approximately 42 μm. A value obtained by rounding off a value calculated by division of y by 42 is a relative positional shift in a pixel unit from the reference color for the segment in the magenta process color. The calculation unit 302 stores, for each of the segments, the relative positional shift in a pixel unit of a segment thus found as a setting value in a register provided in the memory 116. An example of the calculated setting values is illustrated in FIG. 3B. In this example, a setting value 501 indicating that a segment that is one pixel (one line) above a segment 2 is read out from the segment 2, and a segment that is further one pixel (one line) above the segment 2, is read out from the segment 4 is illustrated.

An operation for the correction unit 303 to perform distortion correction based on the calculated setting value 501 will be described below. The correction unit 303 reads out the bitmap image 500 stored in the memory 116 while switching a line read out according to the setting value 501, and writes, on line basis, a bitmap image after correction back into addresses starting from an address 0x20000000 and succeeding thereafter in the memory 116. In reading out the bitmap image 500, the correction unit 303 refers to a setting value calculated by the calculation unit 302 for each of the segments, and reads out the segment at a position that is shifted in the sub-scanning direction by the number of pixels corresponding to the setting value.

A result (a distortion correction result) obtained by reading out the bitmap image 500 from the memory 116 using the setting value 501 illustrated in FIG. 3B is a bitmap image 540 illustrated in FIG. 3D. The lines of the bitmap image 540 are sequentially written, starting at an address 0x20000000 in the memory 116. The bitmap image 540 is obtained by shifting the bitmap image 500 one pixel (one line) downward from a position of the segment 2 and further shifting the shifted bitmap image 500 one pixel (one line) downward at a position of the segment 4.

The bitmap image 500 corresponding to the first line, for example, is read out as follows when it follows the setting value 501 illustrated in FIG. 3B. For the segment 2 and the subsequent segments, not the segment at an address that does not originally exist in the bitmap image 500 but a segment 531 formed of an invalid image (a white pixel group) is read out. More specifically, if the segment to be read out beyond an upper (or lower) boundary of the bitmap image 500 does not exist, the segment 531 formed of an invalid image (a white pixel group) is treated as a reading result. The invalid image is as described in FIG. 2.

When the correction unit 303 performs the distortion correction, as described above, the bitmap image 540 obtained by shifting the segment (pixels) included in the bitmap image 500 in the sub-scanning direction according to the setting value is written into the memory 116.

The output unit 304 transmits the bitmap image 540 after the correction to the printer 130 via the device I/F 117.

The above described distortion correction on the bitmap image is performed for each of the process colors, based on the setting values calculated for each of the process colors, as described above.

<Printing of Chart>

Figure 5A:
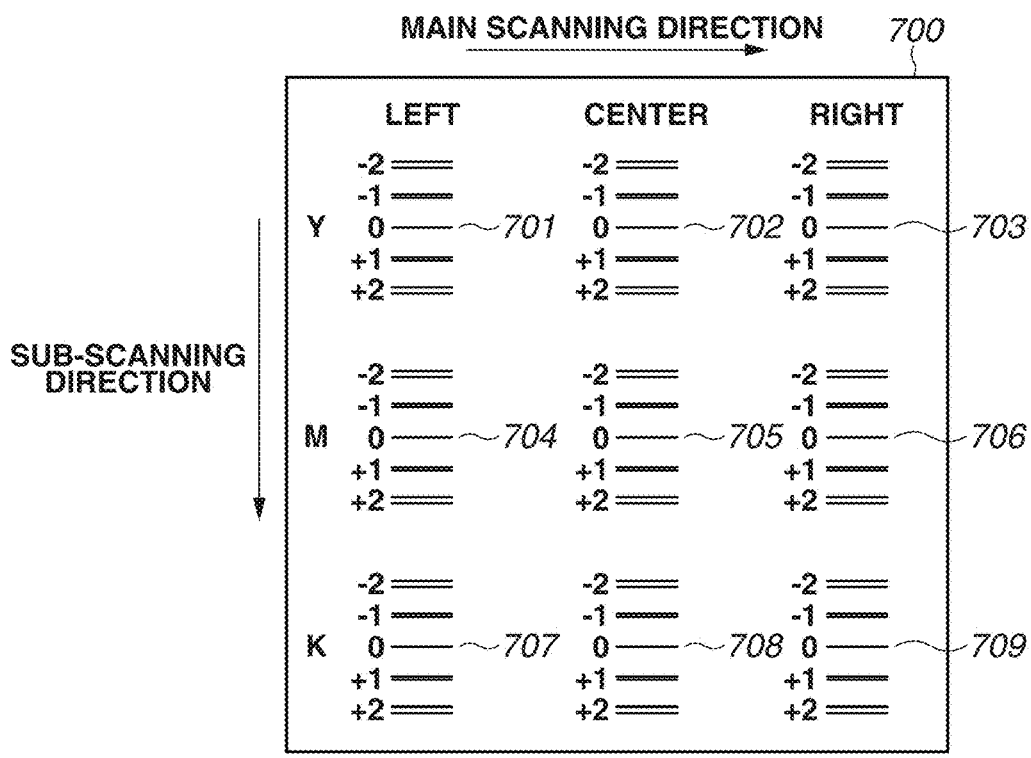
FIGS. 5A, 5B, and 5C illustrate image data including pattern images for correcting distortion information in the sub-scanning direction.

FIG. 5A illustrates a predetermined bitmap image (image data) 700 stored in the HDD 115. The predetermined bitmap image 700 is image data in the four process colors. A chart used for the user to visually confirm the degree of a printing position shift among the process colors in the sub-scanning direction at three points in the main scanning direction is printed based on the bitmap image 700.

The bitmap image 700 includes nine areas 701 to 709. Each of the areas 701 to 709 includes a plurality of lines in the main scanning direction (horizontal lines) having a referential color (cyan) and a plurality of lines in the main scanning direction (horizontal lines) having the process color whose relative position to the referential color is to be corrected. Each of the areas 701 to 703 includes a plurality of horizontal lines in cyan and a plurality of horizontal lines in yellow. Each of the areas 704 to 706 includes a plurality of horizontal lines in cyan and a plurality of horizontal lines in magenta. Each of the areas 707 to 709 includes a plurality of horizontal lines in cyan and a plurality of horizontal lines in black.

More specifically, the horizontal lines in cyan serving as the referential color are included in all the areas, and the degree of a shift (coincidence) in the sub-scanning direction (vertical direction) between the horizontal lines in cyan serving as the referential color and the horizontal lines in the other process color in each of the areas is visually confirmed by the user. The referential color (cyan) used as a basis of visual confirmation of the printing position shift from the other process color differs from the reference color (yellow) used in the above described distortion correction. This is because the user cannot easily perform the visual confirmation if yellow having a luminance relatively higher than those of the other colors is used as the referential color.

The areas 701, 702, and 703 are provided at three different positions, i.e., the left, the center, and the right in the main scanning direction, respectively. Information representing the three different positions (characters "left", "center", and "right" illustrated in FIG. 5A) is also included in the bitmap 700, and is included in a printed chart. The same applies to the areas 704 to 706, and the same applies to the areas 707 to 709. Each of the three different positions corresponds to a different one of positions in the main scanning direction of the three points included in the second distortion information. Each of horizontal lines in the areas 701, 704, and 707 is preferably arranged at the position (XL) in the main scanning direction of the point PL illustrated in FIG. 8. Each of horizontal lines in the areas 702, 705, and 708 is preferably arranged at the position (XC) in the main scanning direction of the point PC illustrated in FIG. 8. Each of horizontal lines in the areas 703, 706, and 709 is preferably arranged at the position (XR) in the main scanning direction of the point PL. The reason is that the closer positions to be visually confirmed by the user in the correction of the distortion information are respectively to the three positions, the more the accuracy of the correction of the color shift using the correction information is improved.

Figure 5B:
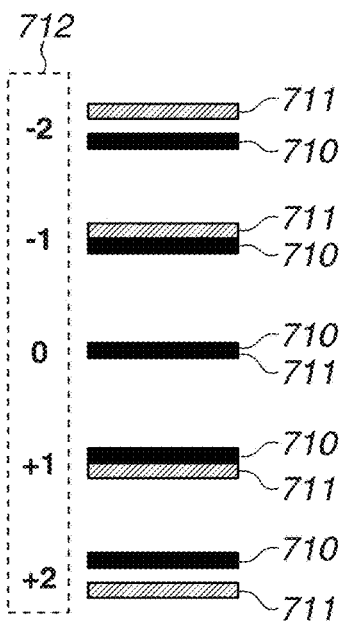

The area 702 will be described with reference to FIG. 5B.

The area 702 includes five patterns each including a pair of a line in cyan and a line in yellow. In FIG. 5B, a uniformly-painted horizontal line 710 is the line in cyan serving as the referential color, and a horizontal line 711 indicated by oblique hatching is the line in yellow. Numerals within an area surrounded by a broken line 712 indicate identification numbers of the patterns. A distance between the line in cyan and the line in yellow (a distance in the sub-scanning direction) differs among the patterns. Each of the patterns has an identification number, which is among the identification numbers indicated within the area surrounded by the broken line 712, and the identification number of the pattern is assigned to its left side. The identification numbers are also printed on the chart. The identification numbers are input by the user via the operation unit 140 as visual confirmation color shift amounts, described below.

In the pattern corresponding to an identification number "−2" in the area 702, the line 711 in yellow is shifted two pixels upward (in a negative direction in the sub-scanning direction) from the line 710 in cyan serving as the referential color. In a pattern corresponding to an identification number "−1", the line 711 in yellow is shifted one pixel upward from the line 710 in cyan. In a pattern corresponding to an identification number "0", the line 711 in yellow is arranged without being shifted from the line 710 in cyan, thus at a position overlapping the line 710 in cyan. In the pattern corresponding to an identification number "+1", the line 711 in yellow is shifted one pixel downward (in a positive direction in the sub-scanning direction) from the line 710 in cyan. In the pattern corresponding to an identification number "+2", the line 711 in yellow is shifted two pixels downward from the line 710 in cyan.

When the bitmap image 700 including the area 702 is printed, as described below, distortion correction in the sub-scanning direction is performed for each of the process colors by the image processing unit 118 (the correction unit 303) using the second distortion information about cyan and yellow. If a curvature characteristic represented by the second distortion information about cyan substantially matches a curvature characteristic of a current scanning line, the distortion correction is appropriate. Thus, an image in the area 702 in the chart to be printed matches an image in the area 702 included in the bitmap image 700. More specifically, the pattern corresponding to the identification number "0" is printed in a manner such that the line in cyan serving as the referential color and the line in yellow overlap each other without the line in yellow being shifted from the line in cyan compared to the pattern corresponding to the other identification number.

Figure 5C:
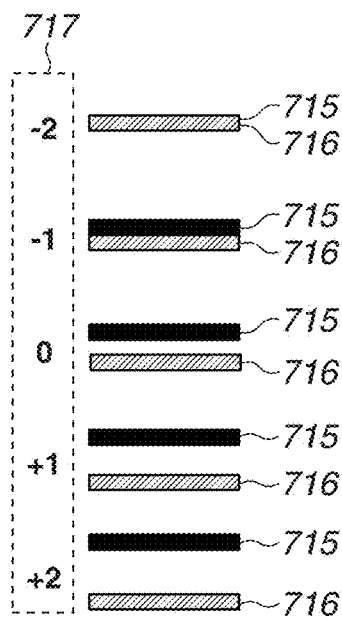

On the other hand, the curvature characteristic represented by the second distortion information about cyan (e.g., the curve 1101 illustrated in FIG. 8) may not match the curvature characteristic of the current scanning line in cyan (e.g., the curve 1102 illustrated in FIG. 8). In this case, in a pattern corresponding to the identification number different from the identification number "0" (e.g., a pattern corresponding to the identification number "−2"), the line in cyan and the line in yellow are printed in such a manner as they overlap each other with shift most suppressed. As illustrated in FIG. 8, if a shift 1103 corresponding to two pixels in a positive direction occurs at a central position between the curvature characteristics 1101 and 1102, an actual scanning line passes through a position that is two pixels in the sub-scanning direction above a position of a scanning line that is assumed by the apparatus at the central position. More specifically, if the curvature characteristic of the scanning line in cyan is in a situation illustrated in FIG. 8, the line in cyan is printed two pixels above the line in yellow serving as a basis of the distortion information at the central position in the printed chart. FIG. 5C illustrates how the area 702 in the printed chart is. In this case, the pattern corresponding to the identification number "−2" is the one in which two lines overlap each other with the shift most suppressed. In this case, in processing in a flowchart described below in FIG. 6A, the user inputs the identification number "−2" into the operation unit 140 as a visual color shift amount corresponding to the area 702.

For each of the other areas 701 and 703 to 709, five patterns, which differ in distance between a line in the referential color and a line in the other process color, are arranged, like in the area 702. When the bitmap image 700 including the other areas is printed, the chart is printed based on a bitmap image on which distortion corrections according to pieces of second distortion information each corresponding to a different one of the process colors have been performed. For each of the areas, the identification number of the pattern in which the line in the referential color and the line in the other color overlap each other with the shift most suppressed is input into the operation unit 140 by the user, like in the area 702.

While the five patterns corresponding to the identification numbers "−2" to "+2" are illustrated in the bitmap image 700 in the present exemplary embodiment, the number of patterns may be increased or decreased, as needed.

While the patterns are respectively arranged at the three different positions in the main scanning direction in the bitmap image 700 in the present exemplary embodiment, the number of positions may be increased or decreased to two or four, as needed. If the number of positions is increased, the accuracy of correction information, described below, is increased. If the number of positions is decreased, a calculation amount associated with calculation of correction information can be decreased.

<Correction of Distortion Information in Sub-Scanning Direction>

FIG. 6 illustrates a flow of processing for correcting distortion information in the sub-scanning direction. The flow is ensured when a processing flow of the control unit 110 and a processing flow of the printer control unit 210 are realized in cooperation with each other. The control unit 110 performs processing according to a program stored in the HDD 115. The printer control unit 210 performs processing according to a program stored in the storage unit 215.

In step S801, the control unit 110 and the printer control unit 210 print a chart for enabling a user to visually confirm the degree of a printing position shift between the process colors in the sub-scanning direction based on a predetermined bitmap image 700 stored in the HDD 115.

Details of a process in step S801 will be described. The CPU 111 in the control unit 110 obtains the predetermined bitmap image 700 from the HDD 115, and stores the obtained bitmap image 700 in the memory 116. Then, the image processing unit 118 performs distortion correction in the sub-scanning direction on the bitmap image 700 stored in the memory 116, and transmits the bitmap image 700 having been subjected to the correction to the printer control unit 210. The processing by the image processing unit 118 is specifically performed as in the following flow.

First, the obtaining unit 301 requests distortion information (second distortion information) of the printer control unit 210. Consequently, the printer control unit 210 obtains first distortion information from the printer engine 220, and combines (adds) the obtained first distortion information with current correction information stored in the storage unit 215, to generate the second distortion information. The generation is performed for each of the process colors. Here, the correction information means information that is used for correcting coordinate positions of three points included in the first distortion information, and three coordinate information respectively corresponding to the three points, for example. For example, pieces of coordinate information for correcting coordinate positions of points PL, PC, and PR in the first distortion information are ΔL[μm], ΔC[μm], and ΔR[μm] in the sub-scanning direction, respectively. More specifically, if pieces of the first distortion information are YL[μm], YC[μm], and YR[μm], the pieces of the second distortion information becomes (YL+ΔL)[μm], (YC+ΔC)[μm], and (YR+ΔR) [μm], respectively. Pieces of correction information (ΔL, ΔC, and ΔR) of when power to the printer engine 220 is turned on are initialized by 0 [μm]. Pieces of correction information (ΔL, ΔC, and ΔR) about the referential color are also 0 [μm]. The printer control unit 210 transmits the generated pieces of the second distortion information to the obtaining unit 301.

Based on the pieces of the second distortion information obtained by the obtaining unit 301 for the process colors, the calculation unit 302 calculates, for each of the process colors, a setting value for a process color as described above. The correction unit 303 performs, for each of the process colors, the distortion correction in the sub-scanning direction on the bitmap image 700 stored in the memory 116 based on the calculated setting value, and writes the bitmap image 700 having been subjected to the distortion correction back into the memory 116. The output unit 304 transmits the bitmap image 700 having been subjected to the distortion correction to the printer control unit 210 via the device I/F 117.

The printer control unit 210 prints the chart using the printer engine 220 based on the bitmap image that has been transmitted from the control unit 110 after having been subjected to the distortion correction.

The foregoing is the printing of the chart based on the bitmap image 700.

In step S802, the operation unit 140 then receives input by the user of a visual color shift amount. A method for the input by the user of the visual color shift amount will be described with reference to FIG. 7.

FIG. 7 illustrates a screen displayed on the operation unit 140. The user visually confirms how the line in the referential color (cyan) and the line in the other process color (yellow, magenta, or black) overlap each other for each of the areas 701 to 709 in the chart that has been printed in step S801. The user inputs an identification number of a pattern in which the lines in the two colors overlap each other with shift most suppressed (match each other) into an input screen illustrated in FIG. 7 for each of the areas. For input of a visual color shift amount between the referential color (cyan) and yellow in FIG. 7, an identification number corresponding to a pattern that satisfies a condition in the area 701 is "0". Thus, the user inputs a visual color shift amount "0" to an input column 1001. An identification number corresponding to a pattern that satisfies a condition in the area 702 is "−2". Thus, the user inputs a visual color shift amount "−2" to an input column 1002. An identification number corresponding to a pattern that satisfies a condition in the area 703 is "0". Thus, the user inputs a visual color shift amount "0" to an input column 1003. User input is similarly performed for the other areas.

When the input of visual color shift amounts each corresponding to a different one of the areas is completed, and an "OK button" is pressed by the user, the operation unit 140 transmits the input visual color shift amounts of the areas to the control unit 110, and the processing in step S802 ends.

In step S803, the control unit 110 transmits a visual color shift amount input completion notification to the printer control unit 210. At this time, the control unit 110 may transmit the visual color shift amounts of the areas, which have been received from the operation unit 140, to the printer control unit 210, or may store the visual color shift amounts in a shared memory (not illustrated) that is shared by the control unit 110 and the printer control unit 210.

In step S804, the printer control unit 210, which has received the visual color shift amount completion notification, obtains the visual color shift amounts of the areas from the control unit 110 directly or via the shared memory.

In step S805, the printer control unit 210 stores the obtained visual color shift amounts in the storage unit 215.

In step S806, the printer control unit 210 calculates, for each of the process colors, correction information about a process color from the visual color shift amounts stored in the storage unit 215. For a method for the calculation, the visual color shift amount input to the input column 1002 corresponding to the area 702 will be described.

The printer control unit 210 obtains the color shift amount "−2", corresponding to the area 702, which has been input to the input column 1002. The visual color shift amount "−2" represents a shift in the sub-scanning direction of a printing position of yellow from a printing position of the referential color (cyan). Thus, a shift in the sub-scanning direction of the printing position of cyan from the printing position of the reference color (yellow) is "+2". The visual color shift amount is represented in a pixel unit. Thus, the printer control unit 210 converts the visual color shift amount into a micrometer unit serving as a unit of correction information. If printing resolution is 600 dpi in the sub-scanning direction, one pixel is converted into 42 μm.

Therefore, the printer control unit 210 finds (+2×42)=+84 [μm] as correction information corresponding to the central position XC about the cyan process color. The printer control unit 210 stores the found correction information in the storage unit 215. Correction information is also similarly found for the other area and the other process color.

The visual color shift amount to be input for the other process color is also information (an identification number) about a color shift of the other process color from the referential color (cyan). Therefore, input for each of the areas 701 to 703 (information about a color shift of the reference color (yellow) from the referential color (cyan)) is also used when the correction information about the other process color is found. For example, it is assumed that the user inputs "−1" to an input column 1004 as a visual color shift amount for the area 705. In this case, from cyan that has been shifted two pixels in a positive direction from yellow, magenta is further shifted one pixel in a negative direction. Thus, the color shift of magenta from the reference color (yellow) becomes +2−1=one pixel. Therefore, "+42 μm" is found as correction information about magenta for the central position XC corresponding to the area 705.

To avoid such complicated calculation in finding the correction information, the referential color may be the same as the reference color.

In step S807, the printer control unit 210 obtains the first distortion information from the printer engine 220.

In step S808, the printer control unit 210 calculates the second distortion information from the correction information, which has been calculated in step S806, and the first distortion information that has been obtained in step S807. The calculation is performed by combining the first distortion information about a process color subject to calculation and the correction information corresponding to the process color, as described above.

In step S809, the printer control unit 210 transmits pieces of the second distortion information, each calculated for a different one of the process colors, to the control unit 110 via the device I/F 117.

In step S810, the obtaining unit 301 and the calculation unit 302 in the control unit 110 calculate setting values, each for a different one of the process colors, based on the pieces of the second distortion information, which has been obtained in step S809, and stores the calculated setting values as newest setting values in the memory 116. The newest setting values, which have been stored in the memory 116, may be used for distortion correction in the sub-scanning direction performed later.

In step 811, the control unit 110 transmits the setting values, which have been calculated in step S810, to the printer control unit 210. The printer control unit 210 may previously store the received setting values of each of the process colors and transmit the stored setting values when requested to transmit the setting values by the control unit 110.

As described above, in the processing flow, the printer control unit 210 calculates the correction information from the visual color shift amount and calculates the second distortion information from the first distortion information and the correction information. The control unit 110 calculates the setting value used for the distortion correction from the second distortion information.

The setting value found from the second distortion information obtained by the foregoing flow is used for the distortion correction in the sub-scanning direction in the subsequent printing performed based print data.

The foregoing is processing for correcting the distortion information that is performed by the MFP 100 according to the first exemplary embodiment. The MFP 100 according to the present exemplary embodiment obtains information (an identification number) about correction of a color shift between the referential color and the other process color at each of the three different positions in the main scanning direction by the input being made by the user who has viewed the chart. The MFP 100 calculates the correction information for correcting the distortion information using the obtained information.

In the present exemplary embodiment, the user inputs the information about the correction for each of the three different positions in the main scanning direction. However, the user may input the information about the correction for each of the two or more different positions in the main scanning direction. If input of information corresponding to a position is performed for each of the two positions, an inclination component (a primary function) of the distortion information can be corrected. If input of information corresponding a position is performed for each of the three or more (e.g., four) positions, the distortion information can be corrected with higher accuracy.

A second exemplary embodiment of the present disclosure will be described below. In the first exemplary embodiment, the correction information about the curvature characteristic (the characteristic of the shift in the sub-scanning direction) of the scanning line of the laser beam is found at the plurality of different positions in the main scanning direction, for each of the process colors. The type of the distortion of the scanning line of the laser beam includes the expansion/contraction in the main scanning direction. The MFP 100 corrects the distortion serving as the expansion/contraction in the main scanning direction by inserting and/or thinning out a pixel piece (one-sixteenth of one pixel in size). The correction is also performed based on pieces of the distortion information each for a different one of the process colors associated with the expansion/contraction in the main scanning direction. In the present exemplary embodiment, correction of distortion information of a process color associated with expansion/contraction in a main scanning direction is realized by a user input performed using a similar chart to that in the first exemplary embodiment, for each of the process colors. More specifically, a chart for visually confirming a color shift in the main scanning direction is printed, and the distortion information is corrected based on a visual confirmation shift amount input from a user based on the chart.

In the following description, a configuration of the MFP 100 according to the second exemplary embodiment is similar to the configuration of the MFP 100 according to the first exemplary embodiment if not otherwise specified.

<Distortion Correction in Main Scanning Direction>

Distortion correction in the main scanning direction will be first described.

FIG. 4 illustrates a part of a configuration of a printer engine 220, as described above. A laser beam does not scan a photosensitive member 604 strictly at a constant velocity depending on an fθ lens 603 in the printer engine 220. More specifically, a scanning length (exposure length) corresponding to one pixel data in one scanning of the laser beam differs depending on a scanning position (a position in the main scanning direction of pixel data), which will be explained as follows.

A section 605 in the main scanning direction is an ideal section in which image data corresponding to one line from one end to the other end of an image is exposed by one scanning of the laser beam (an ideal length of the image corresponding to one line). Consider four sections 606 obtained by equally dividing the section 605, for example. Ideally, the length of each of the four sections 606 is one-fourth of the length of the section 605. Considering that respective image data parts obtained by equally dividing the image data corresponding to one line from the one end to the other end of the image are exposed, a section in which the image data part obtained by the equal division is exposed ideally matches the section 606.

However, the laser beam does not scan the photosensitive member 604 strictly at a constant velocity depending on the fθ lens 603. Thus, the respective sections in which the image data parts obtained by the equal division are exposed differ in length. In FIG. 4, for example, sections where the image data parts obtained by the equal division are respectively exposed are sections 607, 608, 609, and 610 in this order. In FIG. 4, the respective lengths of the sections 607 and 608 become smaller than the length of the section 606, and the respective lengths of the sections 609 and 610 become larger than the length of the section 606.

The printer engine 220 in the present exemplary embodiment thus inserts or thins out pixel piece data (data of a size of less than the size of one pixel) into or from image data at a variable magnification value that differs depending on the sections so that the length of each of the sections 607, 608, 609 and 610 becomes equal to that of the section 606.

The insertion of the pixel piece data means specifying a pixel corresponding to a position into which a pixel piece is to be inserted and inserting the pixel piece between the specified pixel and an adjacent pixel using a pixel value as a pixel value of the pixel. When the pixel piece is inserted, the printer engine 220 makes a period of time to scan the laser beam based on the specified pixel larger by a period of time corresponding to one-sixteenth of the pixel.

The thinning-out of the pixel piece data means specifying a pixel corresponding to a position from which a pixel piece is to be thinned out and thinning out the pixel piece from the pixel. When the pixel piece is thinned out, the printer engine 220 makes a period of time to scan the laser beam based on the specified pixel smaller by a period of time corresponding to one-sixteenth of the pixel.

For example, the printer engine 220 inserts pixel piece data corresponding to a total of three pixels into image data corresponding to the section 607 and inserts pixel piece data corresponding to a total of one pixel into image data corresponding to the section 608. Also, the printer engine 220 thins out pixel piece data corresponding to a total of one pixel from image data corresponding to the section 609 and thins out pixel piece data corresponding to a total of three pixels from image data corresponding to the section 610. An insertion amount or a thinning-out amount of the pixel piece set for each of the sections is referred to as a variable magnification value, and is stored in the printer engine 220, like the first distortion information in the sub-scanning direction in the first exemplary embodiment. The variable magnification value is stored for each of the process colors as first distortion information in the main scanning direction. Correction information in insertion/extraction of a pixel piece is referred to as a minute variable magnification value, and is distinguished, as described below. The minute variable magnification value has its initial value set to "0" for all the process colors and all the sections, and is stored in a storage unit 215, like the correction information in the first exemplary embodiment. The correction information is updated in the present exemplary embodiment.

By the foregoing processing (pixel piece insertion/extraction), the length of each of the sections is made to match the ideal length of the section 606. A variable magnification in each of the sections is one type of distortion information used for correcting a color shift in the main scanning direction, and is set and corrected by processing explained using a flowchart illustrated in FIG. 10, described below.

<Printing of Chart>

Figure 9A:
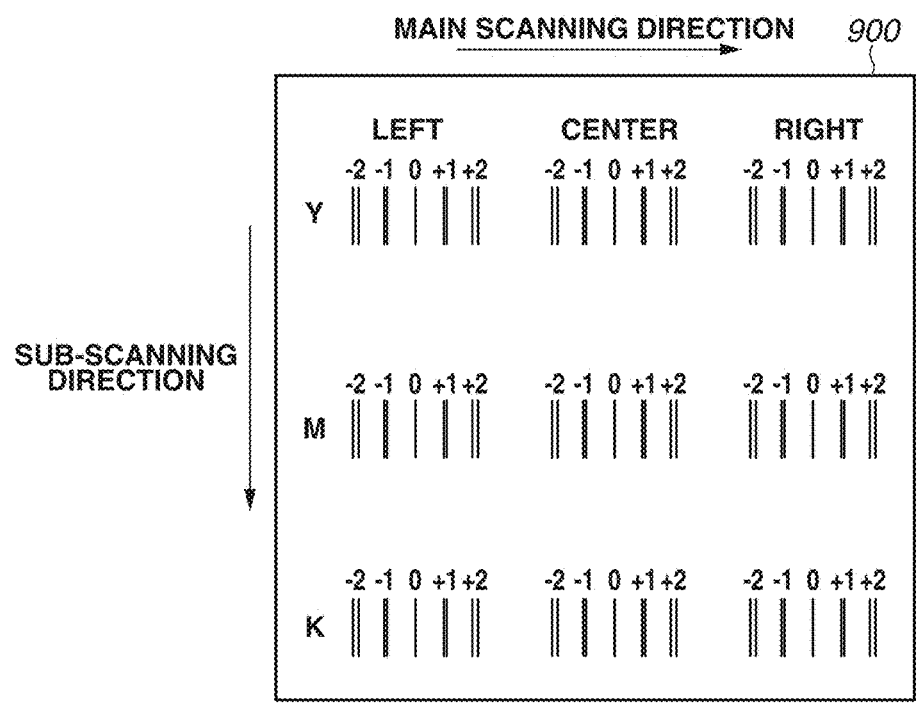
FIGS. 9A, 9B and 9C illustrate image data including pattern images for correcting distortion information in a main scanning direction.

FIG. 9A illustrates a predetermined bitmap image (image data) 900 stored in the HDD 115. The predetermined bitmap image 900 is image data in the four process colors. A chart used for the user to visually confirm the degree of a printing position shift among the process colors in the main scanning direction at three points (the left, the center, and the right) in the main scanning direction is printed based on the image data 900. The bitmap image 900 is similar to the bitmap image 700 illustrated in FIG. 5A except that lines each having any one of the process colors are arranged in a direction parallel to the sub-scanning direction. More specifically, a referential color is cyan. Each of three areas arranged in an upper stage of the bitmap image 900 includes a plurality of pairs of vertical lines in cyan and vertical lines in yellow. A distance between the vertical lines constituting the pair differs depending on the pair. Each of three areas arranged in an intermediate stage of the bitmap image 900 includes a plurality of pairs of vertical lines in cyan and vertical lines in magenta. A distance between the vertical lines constituting the pair differs depending on the pair. Each of three areas arranged in a lower stage of the bitmap image 900 includes a plurality of pairs of vertical lines in cyan and vertical lines in black. A distance between the vertical lines constituting the pair differs depending on the pair.

Figure 9B:
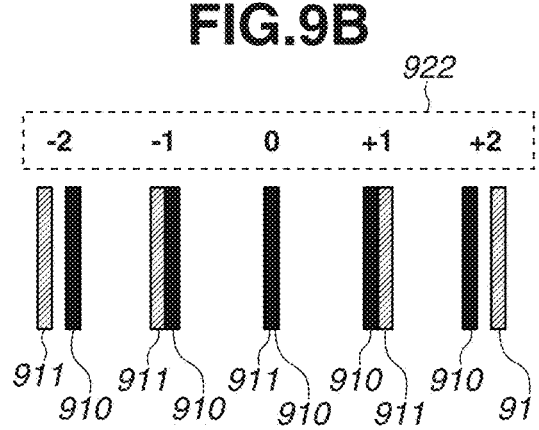

FIG. 9B illustrates a plurality of vertical line pairs included in the area arranged at the center in the upper stage of the bitmap image 900. A line object 910 is a vertical line object in cyan, and a line object 911 is a vertical line object in yellow. Numerals within an area surrounded by a broken line 922 are identification numbers each corresponding to a different one of the pairs, and are also printed in the chart. An identification number "−2" corresponds to a vertical line pair in which the vertical line in yellow is shifted two pixels in a negative direction in the main scanning direction from the vertical line in cyan. More specifically, an identification number "N" corresponds to a vertical line pair in which the vertical line in yellow is shifted N pixels in the main scanning direction from the vertical line in cyan.

Figure 9C:
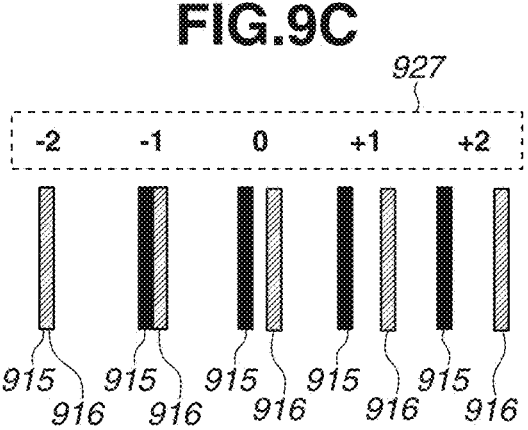

A chart including a plurality of vertical lines is printed based on the bitmap image 900. The chart is printed after distortion correction in the main scanning direction is performed based on distortion information in the main scanning direction in each of the process colors (corresponding to the second distortion information in the first exemplary embodiment) for the bitmap image 900, like for the bitmap image 700 in the first exemplary embodiment. In the printed chart, an area illustrated in FIG. 9B is arranged, as illustrated in FIG. 9C. In this case, in the vertical line pair corresponding to the identification number "–2", the vertical lines overlap each other with shift most suppressed compared to those in the other vertical line pairs. More specifically, a printing position of yellow at a central position is shifted two pixels rightward in the main scanning direction from a printing position of cyan that is assumed by the apparatus. More specifically, the printing position of yellow at the central position is to be corrected to be shifted two pixels leftward from a current printing position with respect to the printing position of cyan.

To perform such correction, the user views the printed chart, specifies the vertical line pair, in which the vertical lines overlap each other with the shift most suppressed, among the plurality of vertical line pairs, and inputs an identification number of the vertical line pair as a virtual confirmation color shift amount into the operation unit 140, like in the first exemplary embodiment. Also in the present exemplary embodiment, input of an identification number is performed for each of the areas. An example of an input screen of the identification number in the operation unit 140 is illustrated in FIG. 7. The screen illustrated in FIG. 7 described in the first exemplary embodiment is an input screen of an identification number for correcting a shift in the sub-scanning direction due to a curvature of a scanning line and is a screen separate from an input screen of the identification number for correcting the shift in the main scanning direction due to the expansion/contraction of the scanning line in the description in the present exemplary embodiment. What is important is that, in both the first exemplary embodiment and the present exemplary embodiment, the user inputs pieces of information for correcting color shifts at a plurality of different positions in the main scanning direction in a manner such that each of the pieces of information corresponds to a different one of the plurality of positions.

For the central position in the printed chart illustrated in FIG. 9C, the user inputs the identification number "–2" to the operation unit 140. A method for calculating correction information for correcting distortion information representing a distortion in the main scanning direction from the input identification number (visual color shift amount) will be described below with reference to FIG. 10.

<Correction of Distortion Information in Main Scanning Direction>

Figure 10:
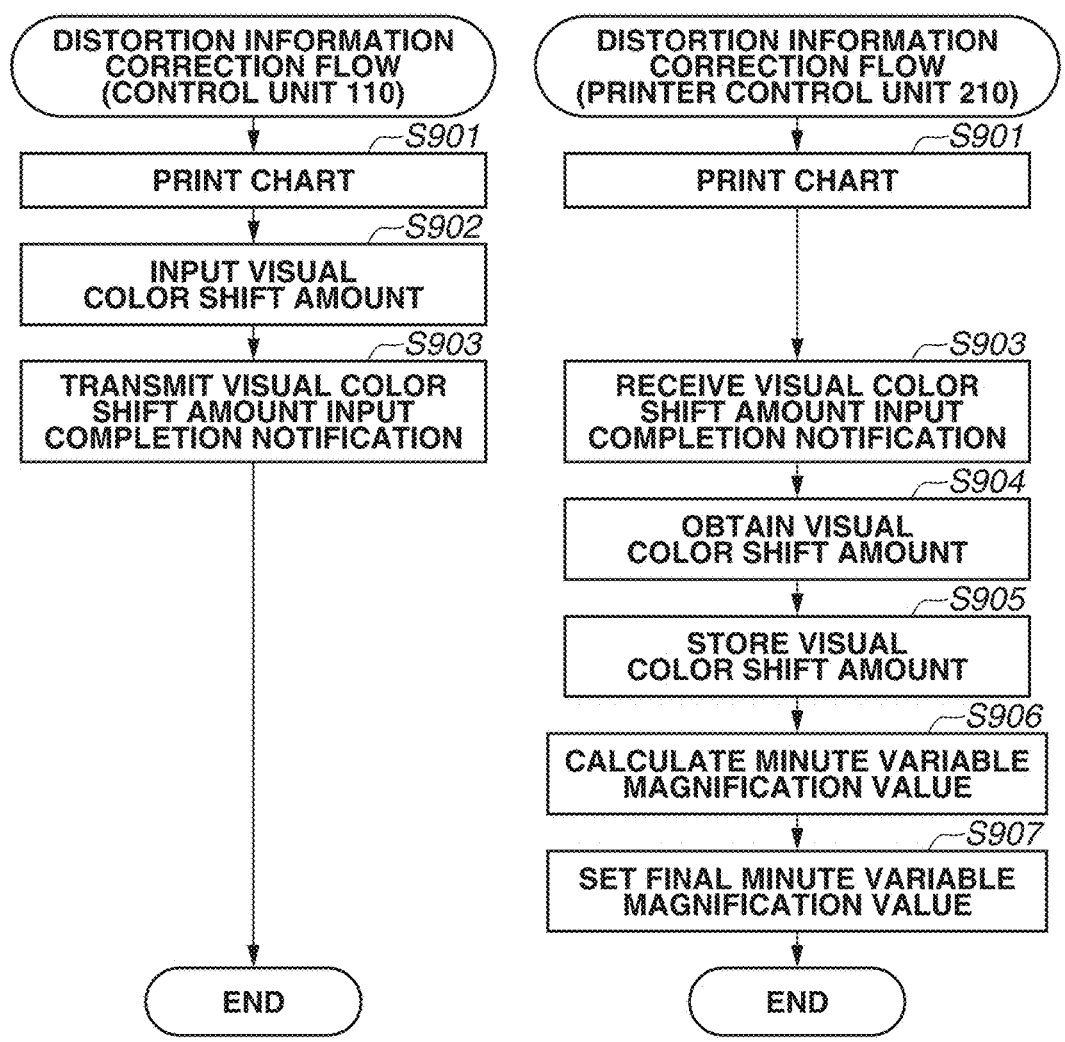
FIG. 10 is a flowchart for calculating correction information about the distortion information in the main scanning direction.

FIG. 10 illustrates a flow of processing for correcting distortion information in the main scanning direction. The processing flow is ensured when a processing flow of the control unit 110 and a processing flow of a printer control unit 210 are realized in cooperation with each other. The control unit 110 is implemented when a program stored in the HDD 115 is loaded into a RAM 112 and is executed by a CPU 111. The printer control unit 210 is implemented when a program stored in the storage unit 215 is rasterized into a RAM 212 and is executed by a CPU 211.

In step S901, the MFP 100 prints a chart based on the bitmap image 900. When the printing is performed, the MFP 100 prints the chart after performing distortion correction (pixel piece insertion/extraction) on the bitmap image 900 using first distortion information and correction information that are stored in the printer engine 220, like in the first exemplary embodiment. The second exemplary embodiment differs from the first exemplary embodiment in that distortion information to be used is distortion information in the main scanning direction, which is different from second distortion information, and distortion correction is not a pixel shift in the sub-scanning direction but pixel piece insertion/extraction. The second exemplary embodiment also differs from the first exemplary embodiment in that insertion and extraction of a pixel piece using distortion information (a variable magnification value) is performed not by the control unit 110 but by the printer control unit 210. The distortion information in the main scanning direction used in the distortion correction by the pixel piece insertion/extraction is the sum of the variable magnification value stored in the printer engine 220 and a minute variable magnification value stored in the storage unit 215. For convenience of illustration, "0" is set to the minute variable magnification value for all the process colors and all the sections.

In step S902, the operation unit 140 receives input of visual color shift amounts (identification numbers) from the user who has visually confirmed the printed chart. The identification numbers illustrated in FIG. 7 are input.

In step S903, the control unit 110 receives the visual color shift amounts from the operation unit 140 and transmits the received visual color shift amount input completion notification to the printer control unit 210.

In step S904, the printer control unit 210 obtains the visual color shift amounts from the control unit 110 according to receipt of the notification from the control unit 110.

In step S905, the printer control unit 210 stores the visual color shift amounts in the storage unit 215.

In step S906, the printer control unit 210 calculates, from the stored visual color shift amounts, minute variable magnification values for each of the process colors. The calculation will be described using the calculation of the minute variable magnification value for cyan as an example.

The visual color shift amounts associated with the calculation of the minute variable magnification values for cyan relates to three areas in an upper stage of the bitmap image 900. In FIG. 7, "0", "–2", and "0" are input in this order from the left as visual color shift amounts between cyan and yellow. More specifically, while a color shift does not occur between cyan and yellow at both ends of an image in the main scanning direction, the printing position in yellow is shifted two pixels rightward (in a positive direction in the main scanning direction) from the printing position in cyan at the center of the image. That is, when the printing position of cyan is shifted two pixels in the main scanning direction (rightward) from the printing position of yellow, an image having no color shift can be printed. A reference color is yellow, like in the first exemplary embodiment. Therefore, a minute variable magnification value corresponding to a section is calculated for each of the sections 607 to 610 illustrated in FIG. 4 so that a pixel piece is inserted into and extracted from image data in cyan the printing position of which is not shifted from the printing position of yellow at both of the ends and is shifted two pixels rightward from the printing position of yellow at the central position. More specifically, the calculation of the minute variable magnification values of the sections 607 to 610 is executed so that pixel piece data corresponding to a total of one pixel is inserted into image data in cyan corresponding to the sections 607 and 608 illustrated in FIG. 4, and pixel piece data corresponding to a total of one pixel is thinned out from image data in cyan corresponding to the sections 609 and 610. For example, minute variable magnification values for cyan corresponding to the sections 607, 608, 609, and 610 are calculated as +¾ of one pixel, +¼ of one pixel, −¼ of one pixel, and −¾ of one pixel, respectively. However, the minute variable magnification values are not limited to these values. The printer control unit 210 calculates such minute variable magnification values of a process color with respect to the reference color for each of the other process colors.

In step S907, the printer control unit 210 adds the minute variable magnification values, which have been calculated in step S906, to the variable magnification value stored in the printer engine 220, to calculate final variable magnification values. The printer control unit 210 sets the final variable magnification values in the storage unit 215. The variable magnification values thus set are used when the distortion correction in the main scanning direction is performed in the subsequent printing.

While the printer control unit 210 has charge of calculating the minute variable magnification values in the flow, the present disclosure is not limited to this.

A third exemplary embodiment of the present disclosure will be described below. An MFP 100 according to the present exemplary embodiment executes the flow for calculating correction information (information for correcting three-point information) in the first exemplary embodiment and the flow for calculating the correction information (minute variable magnification value) in the second exemplary embodiment in combination.

The MFP 100 first performs the calculation of the minute variable magnification values described in the second exemplary embodiment. The MFP 100 then prints a chart in a bitmap image 900 using the final minute variable magnification values obtained by totalizing the calculated minute variable magnification values and previously stored variable magnification values. A user views the chart, and inputs information indicating that correction of distortion information in a main scanning direction (calculation of correction information) is completed to an operation unit 140 in the MFP 100 when the user determines that a color shift does not occur among process colors for all areas. The input is performed by the user touching an OK button displayed on the operation unit 140, for example.

If the OK button is not touched, the MFP 100 executes the calculation flow of the correction information described in the second exemplary embodiment again. If a cancel button is displayed on the operation unit 140 and the user touches the cancel button, processing ends without the correction information in the main scanning direction being updated. In this case, the MFP 100 may or may not execute the calculation flow of the correction information described in the first exemplary embodiment.

If the OK button is touched, the MFP 100 executes the calculation flow of the correction information described in the first exemplary embodiment.

The MFP 100 thus executes the calculation flow of the correction information described in the second exemplary embodiment before executing the calculation flow of the correction information described in the first exemplary embodiment. Therefore, correction information about a curvature distortion of an image in a sub-scanning direction can be calculated after an effect of an expansion/contraction distortion of an image in the main scanning direction is removed. As a result, correction information close to the one represented by a curvature characteristic of an actual scanning line can be calculated.

Other Embodiments

In both of the bitmap image 700 and the bitmap image 900 used for printing the chart in the above described exemplary embodiments, the pattern arranged therein includes lines in two process colors. However, the pattern may include not the lines but other image objects. For example, the image object may be a cross-shaped object or may have any shape if the degree of a shift (coincidence) between the two process colors can be visually identified.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each of the exemplary embodiments, a function for appropriately correcting the printing position shift between the process colors, which differ in degree depending on the position in the main scanning direction, is provided to the user.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2014-263173, filed Dec. 25, 2014, which is hereby incorporated by reference herein in its entirety.

What is claimed is:

1. A printing apparatus comprising:
    a first laser scanner unit configured to irradiate a first photosensitive member with a laser beam to form an image in a first process color;
    a second laser scanner unit configured to irradiate a second photosensitive member with a laser beam to form an image in a second process color;
    a printing unit configured to print an image on paper by overlaying one of the image formed in the first process color by the first laser scanner unit and the image formed in the second process color by the second laser scanner unit with the other,
    wherein the printing apparatus forms an image on the first photosensitive member on a basis of first correction data for correcting distortion, in a sub scanning direction, of a scanning line of the laser beam with which the first photosensitive member is irradiated by the first laser scanner unit, and forms an image on the second photosensitive member on a basis of second correction data for correcting distortion, in the sub scanning direction, of a scanning line of the laser beam with which the second photosensitive member is irradiated by the second laser scanner unit;

a storage configured to store test image data for printing, on each of at least three areas arranged in a main scanning direction, an image that includes a plurality of patterns arranged in the sub scanning direction and each including a first object image formed in the first process color and a second object image formed in the second process color, and includes a plurality of pieces of identification information each for identifying a different one of the plurality of patterns, wherein at each area, a position of the second object image in the sub scanning direction in relation to the first object image differs from pattern to pattern;

a user interface configured to, after printing of a test image based on the test image data, for each of the areas, accept an input, from a user, of a piece of identification information corresponding to a pattern which is included in the plurality of patterns and for which a position where the first object image is formed coincides with a position where the second object image is formed; and a controller configured to generate either one or both of the first correction data and the second correction data on a basis of the identification information inputted via the user interface, wherein the second correction data is data obtained from a curve derived from the identification information input by the user.

2. The printing apparatus according to claim 1, wherein the piece of identification information corresponding to the pattern is a numeral and the numeral is correction data for correcting the second correction data.

3. The printing apparatus according to claim 1, wherein the second laser scanner unit forms a corrected image of the second object image on a basis of the first correction data and on a basis of a correction value based on the identification information corresponding to the at least three areas, inputted via the user interface.

4. The printing apparatus according to claim 1, wherein the second correction data generated by the controller is used for forming an image using image data different from the test image data.

5. The printing apparatus according to claim 1, wherein the first laser scanner unit forms an image in the first process color on the first photosensitive member while changing an image data readout position on a basis of the first correction data, and wherein the second laser scanner unit forms an image in the second process color on the second photosensitive member while changing an image data readout position on a basis of the second correction data.

6. The printing apparatus according to claim 5, wherein the first process color is any one of four process colors consisting of black, magenta, yellow, and cyan, and wherein the second process color is, among the four process colors, a color that is different from the first process color.

7. The printing apparatus according to claim 6, wherein the first process color is not yellow.

8. The printing apparatus according to claim 1, wherein the first object image formed by the first laser scanner unit is an image formed on a basis of the first correction data.

9. The printing apparatus according to claim 1, wherein the controller determines a shift amount of the first object image and the second object image in each of the at least three areas on a basis of the identification information inputted via the user interface, and updates the second correction data on a basis of the determined shift amount.

10. The printing apparatus according to claim 1, wherein the three areas are a left area, a center area, and a right area, in the main scanning direction, of paper on which the test image is printed.

11. The printing apparatus according to claim 1, wherein the image data includes, in addition to the pattern including the first object image formed in the first process color and the second object image formed in the second process color, a pattern including the first object image formed in the first process color and a third object image formed in a third process color, and a pattern including the first object image formed in the first process color and a fourth object image formed in a fourth process color.

12. The printing apparatus according to claim 1, wherein the first correction data is correction data set at time of shipment of the printing apparatus from a factory.

13. A control method for controlling a printing apparatus, the printing apparatus including, a first laser scanner unit configured to irradiate a first photosensitive member with a laser beam to form an image in a first process color, a second laser scanner unit configured to irradiate a second photosensitive member with a laser beam to form an image in a second process color, and a printing unit configured to print an image on paper by overlaying one of the image formed in the first process color by the first laser scanner unit and the image formed in the second process color by the second laser scanner unit with the other, wherein, wherein the printing apparatus forms an image on the first photosensitive member on a basis of first correction data for correcting distortion, in a sub scanning direction, of a scanning line of the laser beam with which the first photosensitive member is irradiated by the first laser scanner unit, and forms an image on the second photosensitive member on a basis of second correction data for correcting distortion, in the sub scanning direction, of a scanning line of the laser beam with which the second photosensitive member is irradiated by the second laser scanner unit, the control method comprising:

printing a test image on a basis of test image data stored in a storage device, the test image data being used for printing, on each of at least three areas arranged in a main scanning direction, an image that includes a plurality of patterns arranged in the sub scanning direction and each including a first object image formed in the first process color and a second object image formed in the second process color, and includes a plurality of pieces of identification information each for identifying a different one of the plurality of patterns, wherein, at each area, a position of the second object image in the sub scanning direction in relation to the first object image differs from pattern to pattern;

accepting an input, from a user, of the identification information corresponding to the pattern for which a position where the first object image is formed coincides with a position where the second object image is formed, after printing of a test image based on the test image data, for each of the areas; and generating either one or both of the first correction data and the second correction data on a basis of the identification information inputted in the accepting of the input, wherein the second correction data is data obtained from a curve derived from the identification information input by the user.

14. A non-transitory computer-readable storage medium storing a program for implementation of a control method for controlling a printing apparatus, the printing apparatus including,
- a first laser scanner unit configured to irradiate a first photosensitive member with a laser beam to form an image in a first process color,
- a second laser scanner unit configured to irradiate a second photosensitive member with a laser beam to form an image in a second process color, and
- a printing unit configured to print an image on paper by overlaying one of the image formed in the first process color by the first laser scanner unit and the image formed in the second process color by the second laser scanner unit with the other, wherein,
wherein the printing apparatus forms an image on the first photosensitive member on a basis of first correction data for correcting distortion, in a sub scanning direction, of a scanning line of the laser beam with which the first photosensitive member is irradiated by the first laser scanner unit, and forms an image on the second photosensitive member on a basis of second correction data for correcting distortion, in the sub scanning direction, of a scanning line of the laser beam with which the second photosensitive member is irradiated by the second laser scanner unit, the control method comprising:

printing a test image on a basis of test image data stored in a storage device, the test image data being used for printing, on each of at least three areas arranged in a main scanning direction, an image that includes a plurality of patterns arranged in the sub scanning direction and each including a first object image formed in the first process color and a second object image formed in the second process color, and includes a plurality of pieces of identification information each for identifying a different one of the plurality of patterns, wherein, at each area, a position of the second object image in the sub scanning direction in relation to the first object image differs from pattern to pattern;

accepting an input, from a user, of the identification information corresponding to the pattern for which a position where the first object image is formed coincides with a position where the second object image is formed, after printing of a test image based on the test image data, for each of the areas; and generating either one or both of the first correction data and the second correction data on a basis of the identification information inputted in the accepting of the input, wherein the second correction data is data obtained from a curve derived from the identification information input by the user.

* * * * *